United States Patent
Iwane et al.

(10) Patent No.: US 6,556,179 B2
(45) Date of Patent: *Apr. 29, 2003

(54) DISPLAY DEVICE AND CAMERA HAVING THE DISPLAY DEVICE

(75) Inventors: Toru Iwane, Yokohama (JP); Toshimi Watanabe, Yokohama (JP); Itaru Homma, Kawasaki (JP); Takehiko Ueda, Tokyo (JP)

(73) Assignee: Nikon Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,509

(22) Filed: Feb. 17, 1998

(65) Prior Publication Data

US 2001/0011966 A1 Aug. 9, 2001

(30) Foreign Application Priority Data

Feb. 17, 1997 (JP) .............................. 9-048458
Jun. 12, 1997 (JP) .............................. 9-169669

(51) Int. Cl.$^7$ ................................. G09G 3/36
(52) U.S. Cl. ................. 345/87; 345/102; 396/296
(58) Field of Search .................. 345/4, 5, 6, 7, 345/8, 9, 87, 103, 102, 50; 348/333, 334, 790, 791, 273, 274, 275; 349/61; 396/287, 296, 147

(56) References Cited

U.S. PATENT DOCUMENTS

| | | | | |
|---|---|---|---|---|
| 4,326,279 A | * | 4/1982 | Shanks | 345/50 |
| 4,371,870 A | * | 2/1983 | Bifferno | 345/4 |
| 4,656,466 A | * | 4/1987 | Yoshida | 345/4 |
| 5,603,068 A | * | 2/1997 | Aihara | 349/61 |
| 5,936,668 A | * | 8/1999 | Sawanobori et al. | 345/103 |

FOREIGN PATENT DOCUMENTS

JP          3-140930          6/1991

OTHER PUBLICATIONS

Liquid Crystal Materials, *WTEC Hyper–Librarian*, Jun., 1992.
Polymer–Dispersed Liquid Crystals: Boojums at Work, MRS Bulletin, J. William Doane, 1991.
Field Controlled Light Scattering from Nematic Microdroplets, 1986 American Institute of Physics, J. W. Doane et al., 1985.

* cited by examiner

*Primary Examiner*—Xiao Wu
(74) *Attorney, Agent, or Firm*—Morgan, Lewis & Bockius LLP

(57) ABSTRACT

Disclosed is a display device which comprises a pair of plate-like light transmittable members; a display member located so as to form a predetermined pattern between a pair of light transmittable members, the display member being composed of a material whose light transmittance is electrically changed; and a pair of light transmittable electrodes, at least one of a pair of light transmittable electrodes having a shape corresponding to the pattern, a pair of light transmittable electrodes being formed on a pair of light transmittable members and for electrically controlling the material. The camera having the display device comprises illuminating means for illuminating the display portion. The display portion is illuminated in accordance with a luminance of a subject. The illuminating light can be also used for measuring a distance and for illuminating another display element.

19 Claims, 12 Drawing Sheets

DISPLAY DEVICE AND CAMERA HAVING THE DISPLAY DEVICE

This application claims the benefit of Japanese Application, Nos. 9-048458 and 9-169669 which are hereby incorporated by reference.

BACKGROUND OF THE INVENTION

1. Field of the Invention

The present invention relates to a display device and more specifically to a display device which is installed on or near a specular surface of an optical finder of a silver salt camera or the like, superimposes a pattern on a finder image and displays the pattern. The present invention also relates to a camera having this display device.

2. Description of the Prior Art

A display device for performing a predetermined display in a finder of a camera or the like has heretofore adopted a method in which a liquid crystal panel filled with a twist type liquid crystal material is controlled by a transparent electrode (ITO). The method using a polymer dispersed liquid crystal has also adopted the method in which this liquid crystal is filled over a glass material surface, a control is operated by the transparent electrode and the display is performed. Recently, the method in which information is displayed in the finder of the camera by the use of a host/guest type liquid crystal has been also adopted.

In case of the camera, many fine prisms are aligned on a finder surface so that they may be shaped into characters and symbols to be displayed. A light is emitted from an upper or a lower portion of the finder, whereby a reflected light directly comes into eyes through the finder so that the characters and symbols are displayed.

Any of the above-described methods has both merits and demerits. Any methods are not said to be desirable. The display device using the twist type liquid crystal has a visual field angle. The display is limited depending on a direction of observation. Furthermore, since a rotating angle of the liquid crystal is controlled, conditions are disadvantageously varied due to a temperature or the like. Thus, a contrast control is required. This results in inconvenience. In case of another arrangement, that is, when the twist type liquid crystal is used for the finder of the camera so that a transmission-type superimposition is performed, a polarizing plate is required for a liquid crystal display. Thus, since a light transmittance is 50% at maximum in a portion which transmits the light, a visual field of the finder is considerably darkened. Therefore, a subject image to be picked up in the finder cannot be clearly seen.

Furthermore, in the method using the polymer dispersed liquid crystal as it is, when the polymer dispersed liquid crystal is turned off, it is cloudy opaque or white turbid and the light is thus scattered. When the polymer dispersed liquid crystal is turned on, it is transparent. Due to such properties, a logic circuit for turning off a portion to be displayed must be constructed. This causes a problem. The fact that a display portion is displayed in a turn-off state does not mean that a display logic has only to be reversely operated. Thus, the problem is not solved.

In case of the commercially available/typical liquid crystal controlled by front and rear electrodes, only when both the front and rear electrodes are turned on, the display portion is visibly recognized. Both the electrodes are therefore arranged so that routes of the front and rear electrodes guided to the display portion may not overlap with each other. Both the electrodes are turned on, whereby it is possible to visibly recognize the display portion alone where the electrodes overlap with each other. This means that the portion alone, where a logical product of the front and rear electrodes is obtained, is displayed in accordance with the logic indicating that the display is accomplished by a turn-on.

However, if this display logic is reversely operated, when at least one of the front and rear electrodes is turned off, the display is performed. Thus, a desired portion alone cannot be displayed by controlling the two electrodes. In this case, the display portion is displayed by a logical sum of both the electrodes. In this method, the selective and limited display cannot be therefore performed. Since the routes of the electrodes are displayed, it is difficult to obtain the high-quality display device.

The method reflecting the light by a microprism is different from the method in which the display portion is blackly emerged by shutting out the light from the portion to be displayed. That is, since the display portion apparently emits the light, the display portion has excellent visibility. Advantageously, the display can be clearly seen even if a background is dark. However, even when the display portion is not displayed, the display portion does not transmit the light and the light remains shut out from the display portion. Thus, this portion disadvantageously conceals the background. Also required is a three-dimensional arrangement in which a projecting portion is located over or under a display surface. Therefore, disadvantageously, an installation is considerably limited for loading this arrangement. It is thus necessary to manufacture a change in the display contents to correct or reform an expensive plastic injection mold. This causes not only a cost problem but also a problem of waste of time. This is a factor which prevents the display contents from being optionally changed as required.

Furthermore, heretofore, in the camera having an AF (auto-focus control) mechanism, an AF auxiliary light irradiating device for irradiating the subject with an AF auxiliary light has been exclusively disposed on a camera body. At the time of the dark background or the like, the subject is irradiated with a luminous flux from a light source such as an LED of this device. The reflected light is detected, whereby an auto-focus control is performed. This device is individually disposed in the camera in order to use the AF auxiliary light.

A single-lens reflex camera is provided with a mechanism in which a diaphragm value shown on a lens ring of a lens attached to the camera is projected into the finder visual field in order that the diaphragm value is confirmed in the finder at the time of a pick-up. This mechanism includes a lens ring illuminating device having an illumination optical system for partially illuminating the lens ring in order to effectively perform such a projection even in a dark environment. This illumination optical system directly illuminates a mark indicative of the diaphragm value of a diaphragm member, whereby the mark of the diaphragm value can be readily projected into the finder even when a natural light is weak.

However, if an additional optical system or the like is arranged in the camera in order to project the AF auxiliary light as described above, this is a considerable burden on the camera having a limited space. Furthermore, since an additional member is needed, a cost is increased. Thus, this device is not desirable in view of the cost. This problem is similarly caused in case of the device for illuminating the diaphragm member.

SUMMARY OF THE INVENTION

It is an object of the present invention to provide a display device having excellent visibility and no dependence on a visual field angle and capable of accomplishing a high-quality display and of immediately switching both of a display brightly emerged in a background and a dark display in accordance with a subject condition and a user's request.

In order to solve the above problem, a display device of the present invention comprises: a pair of plate-like light transmittable members; a display member located so as to form a predetermined pattern between a pair of light transmittable members, the display member being composed of a material whose light transmittance is electrically changed; and a pair of light transmittable electrodes, at least one of a pair of light transmittable electrodes having a shape corresponding to the pattern, a pair of light transmittable electrodes being formed on a pair of light transmittable members and for electrically controlling the material.

According to this display device, the material located in the pattern between the light transmittable members has the same shape as a predetermined pattern. The light transmittance of the material is electrically changed. Thus, when the light transmittance of the material is controlled by the electrodes so that it may be lower, a predetermined pattern transmits less light than the light transmittable members. Therefore, the pattern is displayed in a predetermined shape. When the light transmittance is controlled so that it may be higher, the pattern can transmit the light substantially as much as the light transmittable members. Therefore, the pattern is not displayed. Furthermore, in the display device of the present invention, the display member comprises a plurality of display patterns arranged independently of each other. According to this arrangement, since a plurality of patterns can be independently controlled, they can be independently displayed.

Furthermore, in the display device of the present invention, the display member further comprises a pattern forming member, a concavity is formed on the pattern forming member so that it may be shaped correspondingly to the pattern, and the concavity is filled with the material. According to this arrangement, the concavity having a predetermined pattern is formed in the pattern forming member and the concavity is filled with the material, whereby the pattern having a predetermined shape can be easily arranged.

Furthermore, in the display device of the present invention, the material is a polymer dispersed liquid crystal. The polymer dispersed liquid crystal is composed of a polymer/liquid crystal composite material using a nematic liquid crystal. The polymer dispersed liquid crystal is a field effect type and a light scattering type. The polymer dispersed liquid crystal does not require a polarizing plate. When an electric field is not applied to the polymer dispersed liquid crystal, the polymer dispersed liquid crystal is cloudy opaque or white turbid. The polymer dispersed liquid crystal allows an external light to be scattered. The polymer dispersed liquid crystal does not transmit the external light. When the electric field is applied to the polymer dispersed liquid crystal, the light transmittance is increased and becomes extremely high. The polymer dispersed liquid crystal is characterized by an electric field dependent scattering body exhibiting the higher light transmittance.

Therefore, when the electric field is applied to the scattering body and the scattering body is changed to a light transmittable body, a refractive index of the light transmittable body is substantially the same as that of a pair of light transmittable members. Thus, when the electrodes are turned on, these two materials have substantially the same optical properties. An observer cannot distinguish these materials from each other. Actually, the polymer dispersed liquid crystal is a transparent plate. The pattern is not thus displayed.

When the scattering body is in the scattering state, that is, when the electrodes are turned off, the light is scattered in the portion where the scattering body exists. The polymer dispersed liquid crystal is cloudy opaque or white turbid in the portion where the pattern is formed. A background light which is the external light must be scattered and pass through the scattering body. Thus, a luminous energy is attenuated and the light is shut out. Assuming that the system is illuminated by the background light alone, the scattering body is blackly emerged in the background light, whereby the display pattern is displayed. This pattern display is referred to as a "light shutout display".

The display device of the present invention further comprises illuminating means, wherein, when the light transmittance of the material is controlled so that it may be lower, the illuminating means illuminates the material whereby the pattern is brightly displayed by a scattered light.

When the device is arranged so that the illuminating means may illuminate the pattern, the light is scattered by the pattern-shaped material whose light transmittance is controlled so that it may be lower. Thus, an illuminating light is scattered in the portion where the material exists. This scattered light allows the pattern-like material to be brightly seen. When the observer looks at the pattern, the pattern looks as if the pattern itself glowed. This pattern display is referred to as an "self-light-emitting display".

In case of such a self-light-emitting display, the illuminating means can be arranged so that the light thereof may be incident on end surfaces of a pair of light transmittable members. Furthermore, the illuminating means can be arranged so that the light thereof may pass through the surfaces of a pair of light transmittable members and the pattern may be illuminated with the light.

The display device of the present invention further comprises: illumination-switching determining means for determining whether the illuminating means is switched on or off; and display selecting means for selecting whether or not the pattern is displayed.

According to this arrangement, the illuminating means can be controlled by the illumination-switching determining means. By switching whether the illuminating means is turned on or off, it is possible to switch the self-light-emitting display and the light shutout display. A display type can be determined in accordance with a luminance of the background or the user's request. Moreover, the electrodes are controlled by the display selecting means and the light transmittance of the material is thus changed, whereby whether or not the pattern is displayed can be switched.

Furthermore, the display device of the present invention is applied to a camera. In the camera, the display device is installed on or near an image plane of an optical finder, superimposes the pattern on a finder image and displays the pattern. In this case, the camera may be any one of a video camera, a digital still camera, a silver halide camera or the like.

According to the present invention, in the camera in which the display device having the illuminating means is installed on or near the image plane of the optical finder, superimposes the pattern on the finder image and displays the pattern, the camera comprises: photometering means for measuring the luminance of a subject, wherein the illumination-switching determining means is automatically controlled in accordance with subject luminance information from the photometering means.

According to this arrangement, whether the illuminating means is switched on or off can be controlled in accordance with the subject luminance information from the photometering means disposed for a camera automatic exposure or the like. Thus, when the subject is dark and the background is dark, the illuminating means is switched on whereby the pattern can be brightly displayed. When the background is bright, the illuminating means is switched off whereby the pattern can be darkly displayed. Therefore, the pattern can be darkly or brightly displayed in accordance with a brightness/darkness of the background. The pattern can be easily seen and displayed at all times.

According to the present invention, a method of manufacturing the display device comprises the steps of: forming light transmittable electrodes on a pair of plate-like light transmittable members; forming at least one of the electrodes so that the one electrode may have a predetermined shape corresponding to the display pattern; coating a photo-setting agent on the surface of one of the light transmittable members; irradiating the photo-setting agent layer with the light through a photomask having a light shutout pattern having a predetermined shape corresponding to the display pattern; removing the portion corresponding to the pattern of the photomask from the photo-setting agent layer and forming a concavity having the shape corresponding to the display pattern; filling the concavity with the material whose light transmittance is electrically changed; and fixing the other light transmittable member on the photo-setting agent layer.

According to this arrangement, it is possible to efficiently precisely form the concavity which has the shape corresponding to the display pattern and is filled with the material. The high-precision display device can be efficiently manufactured.

According to the present invention, in the method of manufacturing the display device, the material is the polymer dispersed liquid crystal, the step of fixing the other light transmittable member on the photo-setting agent layer includes the steps of: coating an ultraviolet-curing adhesive on the photo-setting agent layer; locating the other light transmittable member on the photo-setting agent layer; and irradiating the ultraviolet-curing-adhesive-coated portion and the polymer dispersed liquid crystal with an ultraviolet light.

According to this arrangement, when the other light transmittable member is fixed on the photo-setting agent layer by the use of the ultraviolet-curing adhesive, the ultraviolet-curing adhesive portion is irradiated with the ultraviolet light. At the same time, the polymer dispersed liquid crystal is also irradiated with the ultraviolet light, whereby it is possible to obtain desired physical properties of the polymer dispersed liquid crystal.

It is another object of the present invention to provide a camera capable of comprising functions such as an AF auxiliary light irradiating mechanism and a diaphragm member illuminating mechanism without requiring an additional space and a finder display device for realizing this camera.

In order to achieve a second object, according to the present invention, the light from a light source for displaying a region to be auto-focused or the like in the finder can be used as an AF auxiliary light, the light for illuminating a diaphragm member or the like. That is, according to the present invention, the finder display device comprises: a display member having a display portion for performing a predetermined display in a finder; illuminating means for illuminating the display portion of the display member; and an optical system for guiding the light outgoing through the display member to an external member to be illuminated.

According to the present invention, the light for illuminating the display portion is allowed to outgo from the display member. This outgoing light is guided to the external member to be illuminated. Thus, the light for illuminating the display portion is guided outward, whereby this illuminating light can be used as, for example, the AF auxiliary light and the light for illuminating a lens barrel. Moreover, since the particular light source is not required for the AF auxiliary light irradiating mechanism and a lens barrel illuminating mechanism, the mechanisms can be easily arranged whereby a cost is reduced.

The optical system can comprise optical gate means for selectively guiding the light outgoing through the display member to the member to be illuminated. Thus, for example, only when the AF auxiliary light and the lens tube illuminating light are required, the lights can be guided to the members to be illuminated. If unnecessary, the light can be reduced and shut out.

The display member comprises a plate member for forming an optical waveguide, and the illuminating means and the optical system can be disposed near one end surface and the other end surface of the plate member, respectively. Thus, the display member comprises the plate member, the light is incident on one end surface of the plate member, and the plate member is used as the optical waveguide, whereby the display portion can be illuminated. Moreover, the light is allowed to outgo from the other end surface of the plate member, whereby the illuminating light can be guided outward.

The camera can comprise the above-described finder display device. Thus, when the camera comprises the AF auxiliary light irradiating mechanism, the lens barrel illuminating mechanism or the like, it is not necessary to provide an additional light source. These mechanisms can be easily arranged. This can contribute to a cost reduction of the camera.

The subject is illuminated by the light outgoing from the optical system. Thus, even if the subject is dark and a focus detection is thus difficult, the subject is illuminated whereby the focus detection can be performed.

The camera further comprises a mark member. The subject can be illuminated through the mark member by the light outgoing from the optical system. Thus, the subject can be illuminated so that it may have a bright/dark pattern, whereby the focus can be detected from the subject having little pattern itself.

The mark member is a logo mark shown on the surface of the camera. Thus, the logo can be projected on the subject, whereby it is possible to expect an advertisement effect for establishing an identity by a logo. The display portion of the display member displays the region in which the focus detection is performed. This makes the region for the focus detection clear.

The camera further comprises a lens diaphragm member. The lens diaphragm member is illuminated by the light outgoing from the optical system whereby diaphragm information shown on the lens diaphragm member can be visually read by the light reflected from the lens diaphragm member. Thus, the diaphragm member illuminating mechanism can be arranged by the use of the light for illuminating the display portion of the finder display device. Therefore, even when a natural light is weak, the diaphragm information on the lens diaphragm member can be visually recognized.

The device of the present invention may comprise the display member to be the optical waveguide; the light source such as an LED for illuminating the display member; an incident portion disposed on one end of the display member; an outgoing portion disposed on the opposite end; a light shutter member for shutting out a luminous flux and reducing the light or for light transmitting the light; and the optical system for spreading the luminous flux at an appropriate angle or a reflecting member and the optical system for reflecting the light and for illuminating the diaphragm member of the attached lens tube.

BRIEF DESCRIPTION OF THE DRAWINGS

For a more complete understanding of the present invention and the advantages thereof, reference is now made to the following description taken in conjunction with the accompanying drawing, in which.

DETAILED DESCRIPTION OF THE PREFERRED EMBODIMENTS

Preferred embodiments of the present invention will be described below with reference to the accompanying drawings.

Figure 1A:
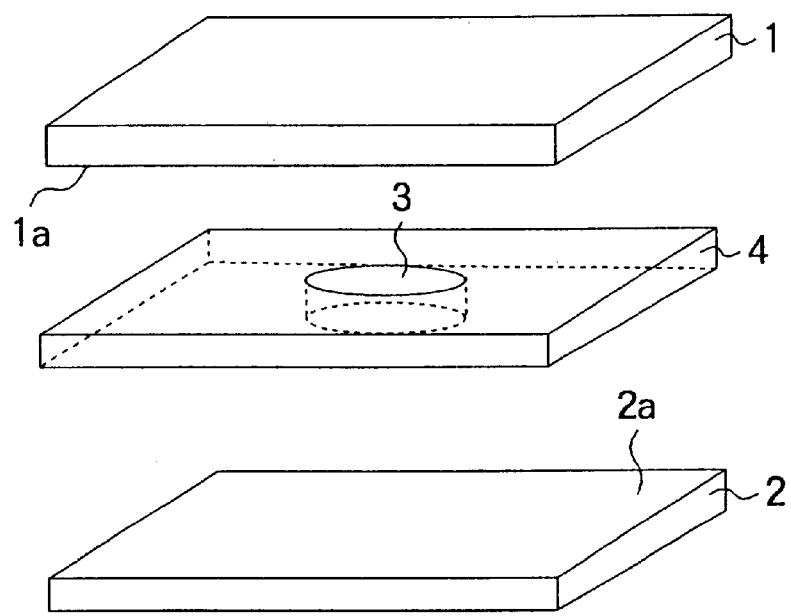
FIGS. 1A and 1B are an exploded perspective view and a cross sectional view of a display device according to an embodiment of the present invention, respectively.
Figure 1B:
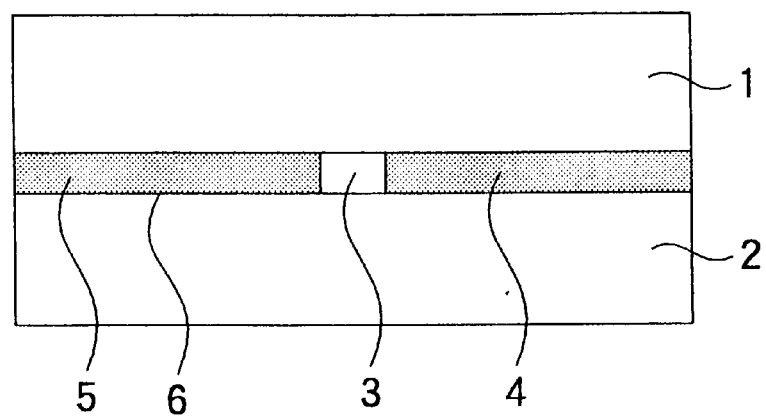

FIGS. 1A and 1B are an exploded perspective view and a cross sectional view showing a schematic arrangement of a display device according to an embodiment of the present invention, respectively. As shown in the drawings, the display device comprises a pair of plate-like light transmittable members 1, 2 composed of a glass or the like, a plate-like pattern forming member 4 located between the light transmittable members 1 and 2, and a pattern portion 3 in which a polymer dispersed liquid crystal is filled in a predetermined-shaped concavity formed on the pattern forming member 4. As shown in FIG. 1B, light transmittable electrodes 5, 6 are formed on opposite inner surfaces 1a, 2a of the light transmittable members 1, 2, respectively. The pattern forming member 4 has substantially the same light transmittance as the light transmittable members 1, 2. In the whole display device, the pattern forming member 4 is a transparent body so that it may light transmit an external light from a background of a subject. In the display device shown in FIGS. 1A and 1B, the pattern forming member is located between the light transmittable members, and the concavity to be filled with the liquid crystal is then disposed on the pattern forming member. On the other hand, the pattern forming member is eliminated, whereby the concavity may be formed directly on the light transmittable members so that the liquid crystal is filled in the concavity.

Figure 2A:
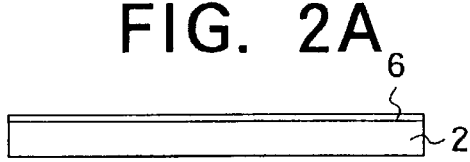
FIGS. 2A–2F are cross sectional views showing a process of manufacturing the display device shown in FIGS. 1A and 1B.
Figure 2B:
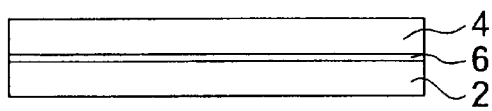

A method of manufacturing the display device shown in FIGS. 1A and 1B will be described with reference to FIGS. 2A–2F. In the first place, as shown in FIG. 2A, an ITO (indium/tin oxide) film is deposited on a glass plate 2 used as the light transmittable member so that the glass plate 2 may have a predetermined shape, whereby the light transmittable electrode 6 is formed. Next, an ultraviolet-curing adhesive 4 is coated onto the glass plate 2 on which the electrode 6 is formed (FIG. 2B). A thickness of an ultraviolet-curing adhesive layer is the thickness of the pattern forming member 4. The thickness of the ultraviolet-curing adhesive layer is also that of the liquid crystal on the pattern portion 3. The light transmittance depends on this thickness, when the liquid crystal is cloudy opaque or white turbid. Thus, preferably, the adhesive layer is uniformly coated by a spin coat method using a centrifugal force or other methods so that the thickness thereof may be uniform.

Figure 2C:
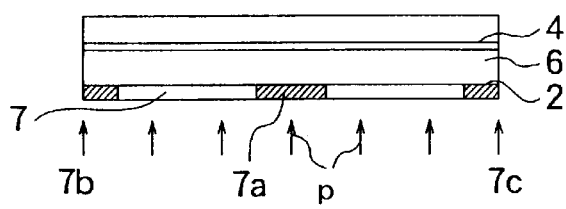
Figure 2D:
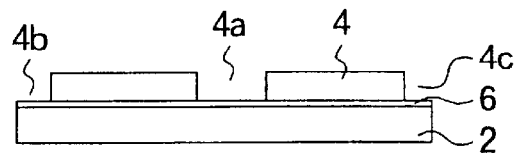
Figure 2E:
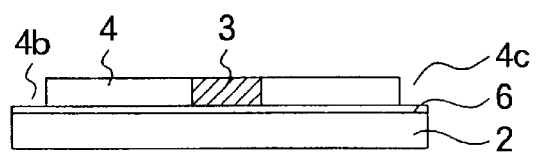
Figure 2F:
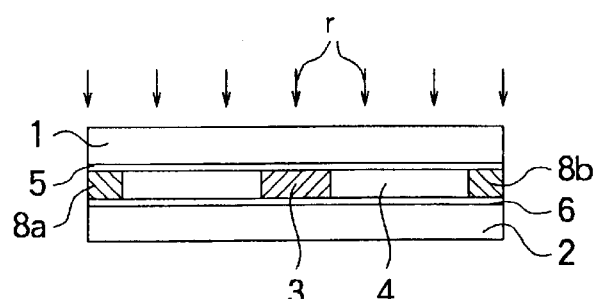

Next, as shown in FIG. 2C, the surface of the glass plate 2 is covered with a photomask 7 having a light shielding or light shutout portion 7a corresponding to the shape of the pattern portion 3 and light shielding or light shutout portions 7b, 7c for forming adhesive layers 8a, 8b described below. The photomask 7 is irradiated with an ultraviolet light p. The ultraviolet-curing adhesive 4 other than the portions corresponding to the light shutout portions 7a, 7b, 7c is thus cured, whereby the pattern forming member 4 is formed. The photomask 7 may be located on the pattern forming member 4.

An irradiation with the ultraviolet light is prevented in the portions corresponding to the light shutout portions 7a, 7b, 7c on the ultraviolet-curing adhesive 4. Consequently, the corresponding portions remain uncured and liquid. Thus, a solvent is washed away, whereby concavities 4a, 4b, 4c are formed as shown in FIG. 4D. The concavity 4a is filled with the polymer dispersed liquid crystal, whereby the pattern portion 3 is formed (FIG. 4F).

Next, the ultraviolet-curing adhesive is poured into the concavities 4b, 4c. The pattern forming member 4 is then covered by the glass plate 1 used as the light transmittable member on which the predetermined-shaped light transmittable electrode 5 is formed by a deposition in the same manner as described above. As shown in FIG. 4F, the polymer dispersed liquid crystal filled in the pattern portion 3 and the ultraviolet-curing adhesives 8a, 8b poured in the concavities 4b, 4c are irradiated with an ultraviolet light r. Thus, the ultraviolet-curing adhesive layers 8a, 8b are cured, whereby the glass plate 1 is fixed on the pattern forming member 4. At the same time, the polymer dispersed liquid crystal filled in the pattern portion 3 is also irradiated with the ultraviolet light. Thus, it is possible to obtain desired physical properties of the polymer dispersed liquid crystal.

As described above, the light shielding or shutout photomask having the shape corresponding to the shape of the display pattern and the ultraviolet-curing adhesive are used, whereby the display device having the pattern portion filled with the liquid crystal can be efficiently precisely manufactured. The display device can be also manufactured by the method other than this method. For example, the adhesive or the transparent body is arranged on the glass plate in a desired shape by a printing. In this case, a spacer such as a plastic sphere of a constant diameter is added to the adhesive, whereby it is possible to obtain the adhesive layer (pattern member) of a predetermined thickness.

Figure 3:
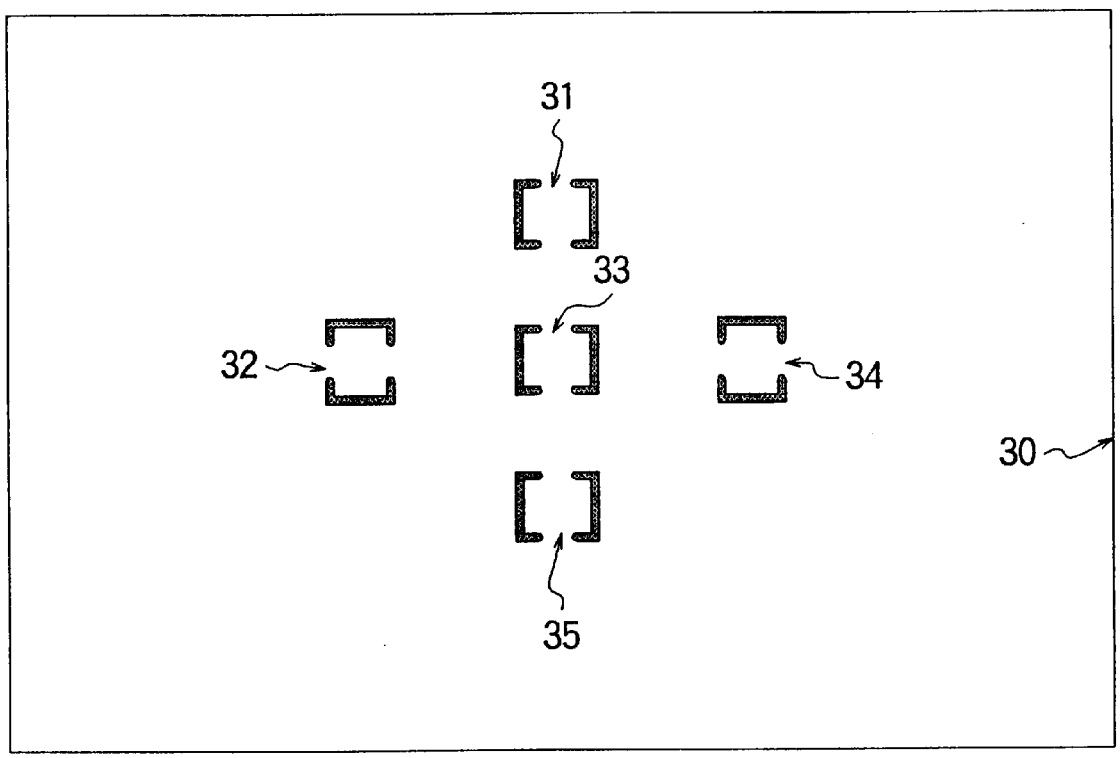
FIG. 3 is a plan view showing an example of a display pattern in the display device.

An example of the display pattern will be described below with reference to FIG. 3. The display pattern of the display device shown in FIG. 3 is provided when the display device shown in FIG. 1 is applied to a finder of a camera. A frame 30 in FIG. 3 shows a whole frame of the finder of the camera. In this finder, as shown in FIG. 3, display patterns 31, 32, 33, 34, 35 are formed in five regions. A plan shape of each display pattern is formed like a pair of parentheses. For example, the display patterns are used in order to display the portion to be auto-focused in the finder of the camera.

The pattern portion 3 shown in FIGS. 1A and 1B is formed so that it may display the display patterns 31–35 shown by black thick lines in FIG. 3. Each pattern portion is filled with the polymer dispersed liquid crystal. This pattern portion can be changed by controlling the electrodes so that it may be cloudy opaque or transparent. The light transmittance of each pattern portion is changed in accordance with this change in state, whereby one or all of the five display patterns 31–35 in the finder can be superimposed on the background and displayed as required.

Figure 4:
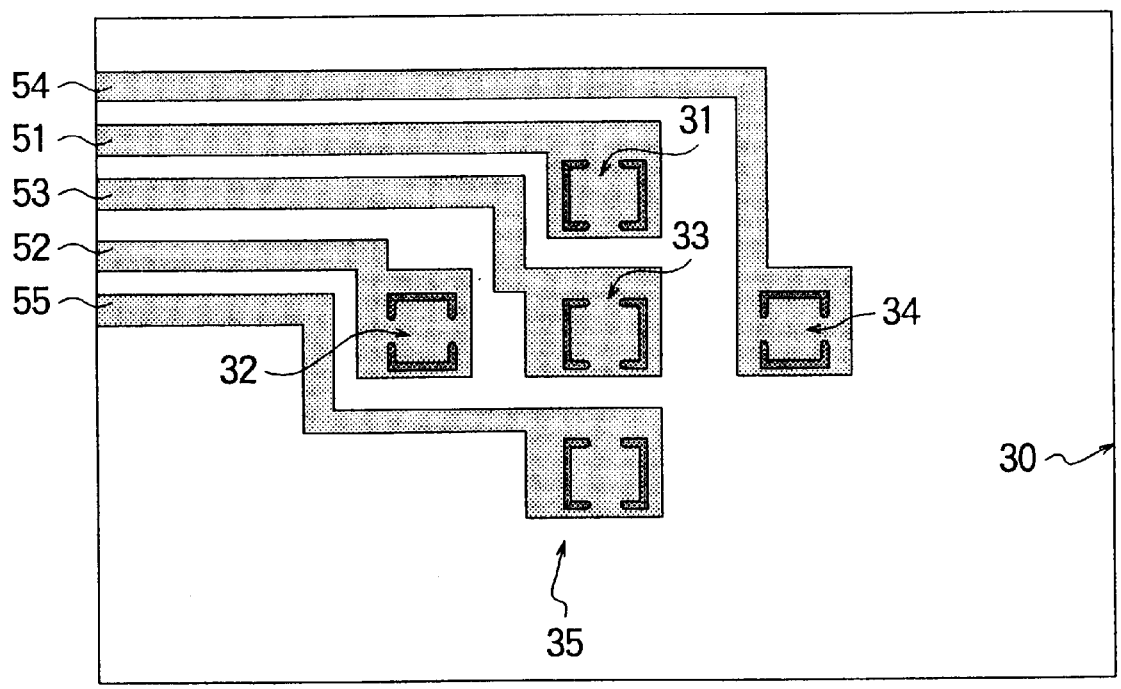
FIG. 4 is a plan view showing a shape of a light transmittable electrode corresponding to the shape of the display pattern shown in FIG. 3.

The light transmittable electrodes having the plan shape corresponding to the display pattern shown in FIG. 3 will be described with reference to FIG. 4. One of a pair of light transmittable electrodes (for example, the electrode 6 shown in FIG. 1B) is uniformly deposited on the glass plate, whereby no pattern is formed on the electrode. As shown in FIG. 4, the other electrodes (for example, the electrode 5 shown in FIG. 1B) 51, 52, 53, 54, 55 are deposited on the glass surface so that the polymer dispersed liquid crystal located on each pattern portion can be switched and so that they may correspond to the plan shape of the display patterns 31–35 shown by the black thick lines in FIG. 4, whereby the other electrodes are formed.

As shown in FIG. 4, the light transmittable electrodes 51–55 are narrowly lengthwise formed from the left side of FIG. 4 so that they may be directed toward a position where each display pattern is displayed. The light transmittable electrodes 51–55 are arranged so that they may rectangularly cover the whole display patterns 31–35 shaped like a pair of parentheses. On the left side of FIG. 4, interface electrodes (not shown) are disposed correspondingly to the display patterns.

For example, when the center display pattern 33 alone is displayed in the finder, the electrode 53 alone is turned on. Thus, the patterns 31, 32, 34, 35 other than the center display pattern 33 are changed from a white turbid or cloudy opaque state to a transparent state. The center display pattern 33 alone remains cloudy opaque or white turbid. The center display pattern 33 does not light transmit the external light. The pattern 33 alone is thus displayed. In the same manner, other display patterns can be optionally selectively displayed with ease. When the electrodes are made of ITO, an area resistance is about several tens of ohms. Thus, when the patterns are too fine, caused is a problem due to a time constant generated by a charge capacity of ITO on both the surfaces including the display portion. The time constant can have an influence on a display response. Thus, preferably, a size of an electrode pattern is formed as large as possible.

Figure 5:
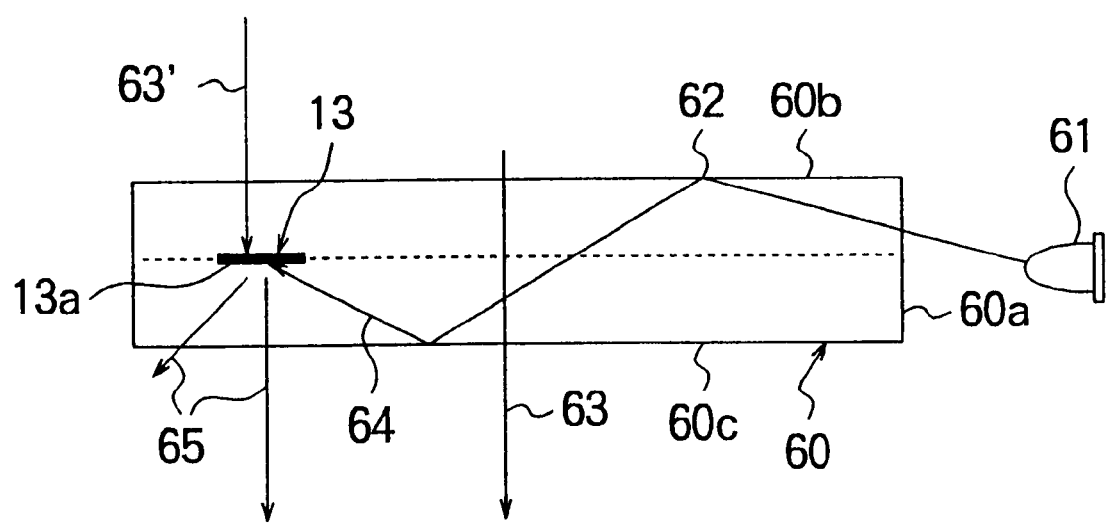
FIG. 5 is a schematic elevational view showing the example of an arrangement of an illuminating light source in the display device shown in FIG. 1.

Referring to FIG. 5, the following description is provided for the example in which, in the display device, an illuminating light source is arranged so that an illuminating light may be incident on an end surface and the pattern portion may be illuminated. FIG. 5 is an elevational view schematically showing a display device 60 having a display pattern portion 13 arranged as shown in FIGS. 1 through 4. An LED 61 is located as the illumination light source beside an end surface 60a of the display device 60. The LED 61 is arranged so that the light from the LED 61 may be incident on the end surface 60a and come into the display device 60.

In the display device shown in FIG. 5, a luminous flux from the LED 61 is incident on the end surface 60a. The luminous flux is totally reflected on a point 62 on an air contact surface, that is, one surface 60b of the display device 60. The luminous flux is then directed toward the other surface 60c, where it is also totally reflected. The luminous flux travels toward the opposite end surface. As shown by an arrow 64 in FIG. 5, a lower surface 13a of the display pattern portion 13 is illuminated. In such a manner, the light transmittable member of the display device 60 serves as an optical waveguide for an illuminating luminous flux. On the other hand, a background light 63 of the subject is incident on the one surface 60b of the display device 60 from an upper portion of the drawing and comes into the display device 60. The background light 63 passes through the display device 60 and outgoes from the other surface 60c toward a lower portion of the drawing. Therefore, the other surface 60c of the display device 60 is seen from the lower portion of the drawing by a user.

An electric field is not applied to the polymer dispersed liquid crystal located on the display pattern portion 13, whereby the display pattern portion 13 is cloudy opaque or white turbid. At this time, a background light 63' is shut out by the display pattern portion 13, while the lower surface 13a of the pattern portion 13 is illuminated by the light from the LED 61. This illuminating light is scattered whereby it is changed to a scattered light 65. Thus, the display pattern portion 13 is brightly seen. When the user looks at the pattern portion 13, the pattern portion 13 looks as if the pattern portion 13 itself glowed. Thus, the pattern can be displayed by an self-light-emitting display. According to this self-light-emitting display, the LED 61 is allowed to emit the light, whereby the display pattern portion 13 can be brightly displayed. The self-light-emitting display is thus suitable for the use when the subject is dark and the background is dark.

Furthermore, the LED 61 is not allowed to emit the light, whereby the background light 63' is shut out by the display pattern portion 13. This allows the pattern portion 13 to be darkly displayed. Such a light shutout display is suitable for the use when the background is bright.

In FIG. 5, although the LED 61 is located so that the light thereof may be incident on the end 60a of the display device 60, the illumination light source such as the LED may be located so that the light may be incident on the other surface 60c and the lower surface 13a of the display pattern portion 13 may be illuminated by the incident light.

Figure 6:
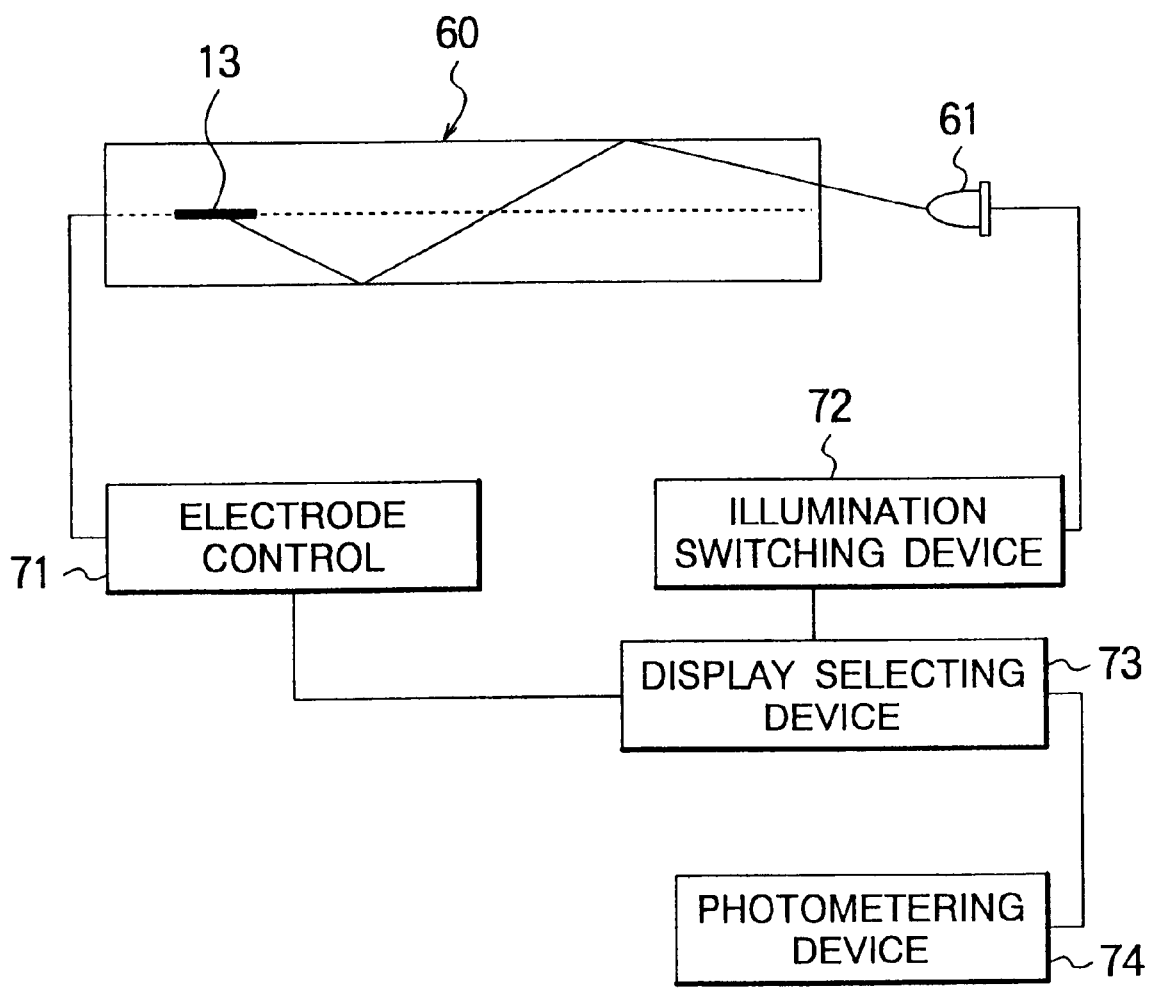
FIG. 6 is a schematic elevational view showing the example in which an illumination switching device and a display selecting device are added to the display device shown in FIG. 5.

Referring to FIG. 6, the following description is provided for the display device in which an illumination switching device or the like is added to the arrangement shown in FIG. 5.

The display device shown in FIG. 6 comprises an electrode control device 71 for controlling the electrodes on the display pattern portion 13 of the display device 60 shown in FIG. 5; an illumination switching device 72 for driving the LED 61; a display selecting device 73 for controlling the electrode control device 71 and the illumination switching device 72 and being capable of selecting the self-light-emitting display and the light shutout display and of selecting whether or not the display pattern portion is displayed; and a photometering device 74 for obtaining subject luminance information.

The electrode control device 71 controls an application of the electric field to the polymer dispersed liquid crystal located on the display pattern portion 13. The electric field is applied to the liquid crystal, whereby the display pattern portion 13, which is normally cloudy opaque or white turbid, can be changed to a light transmittable state. The illumination switching device 72 can drive the LED 61 and control whether or not the display pattern portion is displayed. The display selecting device 73 can control the electrode control device 71, select whether or not a plurality of display patterns such as the display patterns 31–35 shown in FIG. 3 are optionally displayed and select whether or not the illumination switching device 72 allows the LED 61 to emit the light. The photometering device 74 can measure the luminance information of the subject, send the luminance information to the display selecting device 73, control the illumination switching device 72 and determine whether or not the LED 61 emits the light.

According to the display device shown in FIG. 6, the display selecting device 73 can display the optional one or ones of the display patterns 31–35. It is also possible to select the self-light-emitting display and the light shutout display in accordance with a brightness/darkness of the background and the user's request. Moreover, the photometering device 74 obtains the luminance information of the subject which is the background. The illumination switching device 72 is automatically controlled in accordance with this information so that it may be driven when the background is dark and it may be not driven when the background is bright. It is possible to automatically select and immediately switch the self-light-emitting display and the light shutout display.

As regards the display device display pattern to be superimposed on the background varying in the finder of the camera or the like, "visibility conditions" of display contents of the display pattern depend on the background. The absolutely excellent display is not possible. When the background is bright, the light shutout display for shutting out the light and darkening is desirable. However, this display is not always required, for example, when a photograph is taken in a dark place requiring a flash. On the contrary, although the self-light-emitting display is suitable for the dark background, it is not always suitable for the bright background. When the pattern is displayed at such a high luminance that the pattern can be seen even in the bright background, the display is so bright in the dark background that the background cannot be seen. Thus, the display device capable of displaying the pattern in accordance with the conditions is desired. In the display device shown in FIG. 6, since the user can optionally select the light shutout display and the self-light-emitting display by the display selecting device 73 in accordance with the brightness of the background and the user's request, this display device is preferable.

For example, when the background is a blue sky or the like and very bright, the illumination switching device 72 is not driven so that the display pattern portion 13 may not be displayed. In this case, the light transmittance of the display pattern portion 13 is few percents in a scattering state in which the external light is scattered. Therefore, as long as the display portion is seen from the finder, the display portion is clearly seen in the dark background. When an environment is dark, the LED 61 is switched on, whereby the illuminating light is scattered in the display pattern portion 13. In such a manner, the pattern can be displayed in such a manner that the pattern looks like as if a bright illuminant glowed in the dark place. The photometering device 74 automatically selects such a desirable display in accordance with the background. It is thus possible to achieve the display device capable of complying with any brightness of the background.

More preferably, a selection of the display types can be changed not only in accordance with the brightness of the background but also in accordance with a contrast of the background. In case of the camera, the information about the background brightness can be obtained by the use of an output obtained from a signal of a photometric element for exposure and a light receiving element for autofocussing. When it is possible to obtain an electronic image picked up by a video camera, a digital still camera or the like, the information about the background contrast can be obtained from the electronic image. When a typical silver salt camera is provided with an auto-focus mechanism of a phase contrast system for measuring a distance by the use of a parallax of the image, it is also possible to obtain the background contrast information depending on spatial frequency information, the data of which is resolved in by Fourier transformation manner.

The display selecting device 73 shown in FIG. 6 is disposed on an outer portion of a device body such as the camera so that the user's request can be input. The display device in the device body is provided with the photometering device 74 for evaluating the brightness and the contrast of the subject background and for providing the information for selecting the display type. In such an arrangement, the display device can perform an optimum display at all times.

As described above, in the display device according to the embodiment, the polymer dispersed liquid crystal is arranged in a predetermined pattern. Thus, it is possible to solve a display problem in which the shape of the electrode is also displayed due to properties of the polymer dispersed liquid crystal, that is, the fact that it becomes cloudy opaque or white turbid when a power source is turned off. The polymer dispersed liquid crystal can be therefore used for the display device in the same manner as the typical liquid crystal. Moreover, the display pattern portion filled with the polymer dispersed liquid crystal is not illuminated by the use of scattering properties of the polymer dispersed liquid crystal, whereby it is possible to perform two types of the self-light-emitting display and the light shutout display.

Since the polymer dispersed liquid crystal does not need a polarizing plate unlike the typical liquid crystal, the light transmittance of the external light can be increased. It is thus possible to accomplish the display device capable of the display having brightness, ease-to-see, excellent visibility and high quality. Since the polymer dispersed liquid crystal responds at high speed by controlling whether or not the electric field is applied, the light transmittance can be immediately changed.

As described above, according to this embodiment, it is possible to provide the display device having excellent visibility and no dependence on a visual field angle and capable of accomplishing the high-quality display and of immediately switching both of the display brightly emerged in the background and the dark display in accordance with the subject condition and the user's request. Thus, it is possible to arrange the display device for performing the display which is not influenced by the background and is clear.

Figure 7:
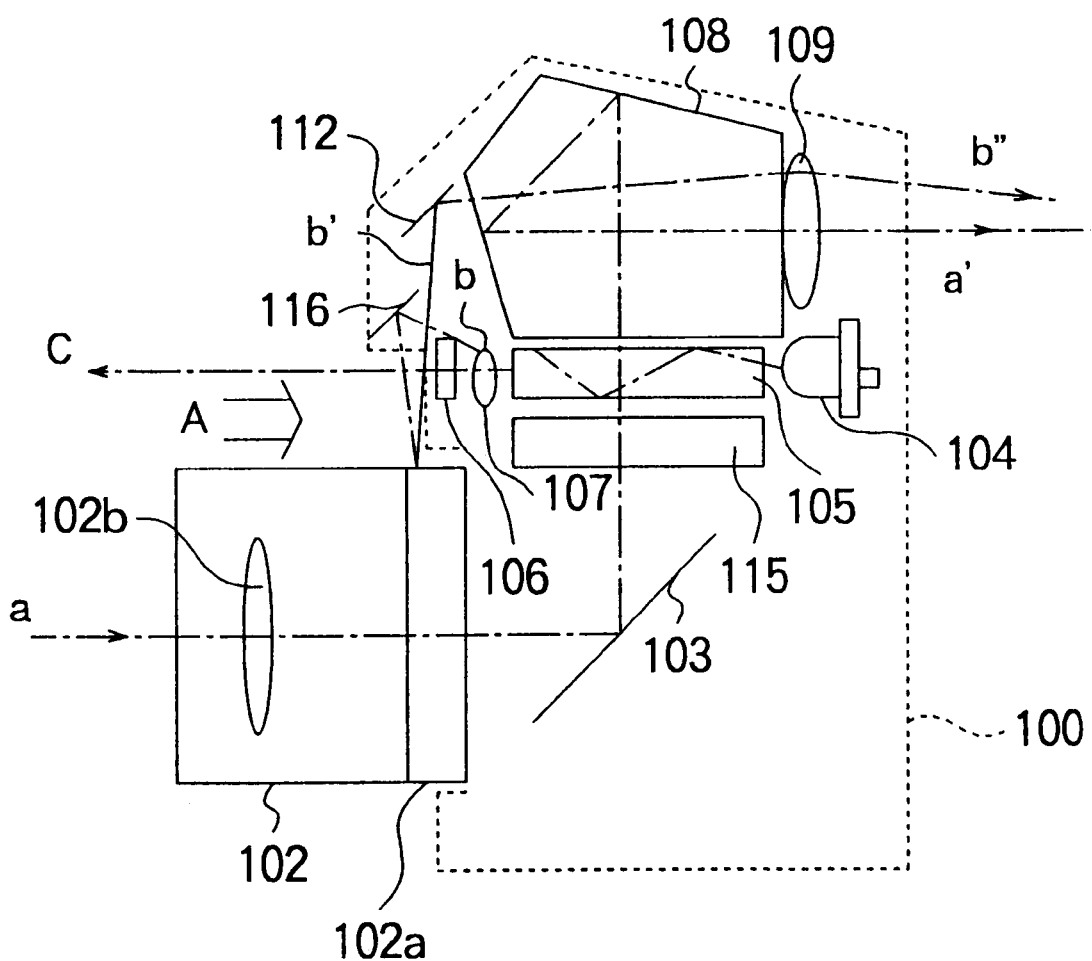
FIG. 7 is a side cross sectional view showing the schematic arrangement of a camera according to a second embodiment of the present invention.
Figure 8:
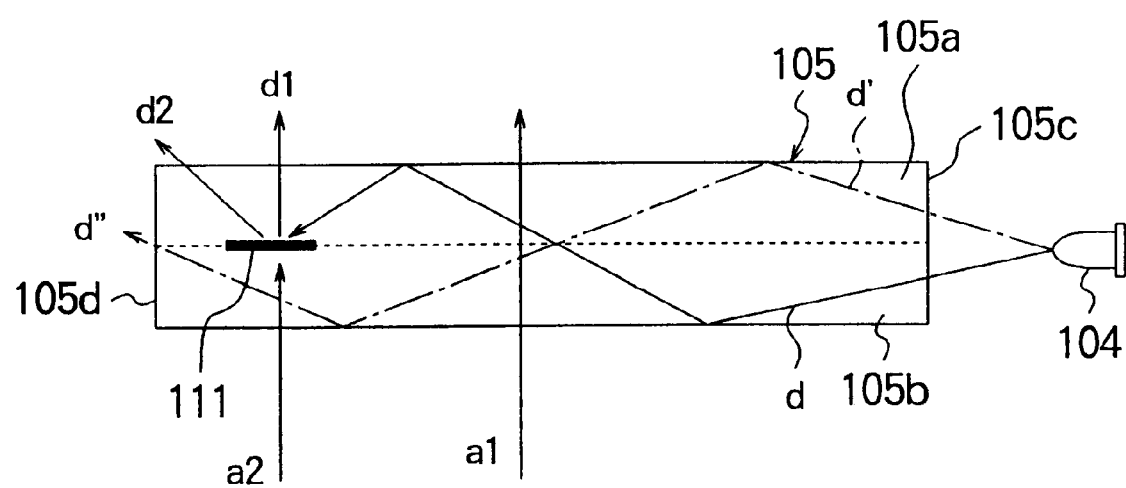
FIG. 8 is a cross sectional view showing a finder display member shown in FIG. 7.

A second embodiment of the present invention will be described below with reference to the accompanying drawings. FIG. 7 shows the schematic arrangement of the camera according to the second embodiment of the present invention. FIG. 7 is a side cross sectional view taken along the luminous flux which is incident on the camera. FIG. 8 is a cross sectional view of a finder display member shown in FIG. 7.

The camera shown in FIG. 7 is a single-lens reflex camera 101 having an auto-focus control mechanism. The camera 101 comprises a lens barrel 102 having a diaphragm member 102a and a lens 102b, a reflecting mirror 103 on which a subject light is reflected toward the finder, a screen 115, a finder display member 105, a pentaprism 108 and an eyepiece 109. The subject light is incident on the lens 102b of the lens tube 102 from a direction shown by a in FIG. 7. This incident light is guided to the screen 115 and the finder display member 105 in the upper portion of FIG. 7 through the reflecting mirror 103. The light outgoes in a direction of a' in FIG. 7 through the pentaprism 108 and the eyepiece 109. When a photographer looks into a finder window (not shown), the photographer can see a subject image.

As shown in FIGS. 7 and 8, a finder display device comprises the finder display member 105, a light emitting device 104 composed of the LED or the like located near an end surface 105c of the finder display member 105, and a shutter 106 and an objective lens 107 as optical gate means located, in this order, near the other end surface 105d of the finder display member 105.

As shown in FIG. 8, the finder display member 105 comprises a plate member which is formed by bonding two glass plates 105a, 105b to each other. A display portion 111 is located between the glass plates 105a and 105b. The display portion 111 comprises the liquid crystal whose scattering coefficient is electrically changed. A predetermined portion is changed from a scattering body to a transparent body and vice versa depending on a turn-on state or a turn-off state. When a predetermined portion is changed to the scattering body, the display is operated. As shown in FIG. 8, the lights from the subject are incident on the finder display member 105 as shown by arrows a1, a2. Although the finder display member 105 transmits the light a1, the light a2 is shut out. On the other hand, when a predetermined portion is changed to the scattering body, the light from the light emitting device 104 is incident on the end surface 105c of the finder display member 105. As shown by d in FIG. 8, this incident light is guided into the glass plates 105a, 105b as the optical waveguide. The light is totally reflected on an interface the glass plates 105a, 105b while it travels toward the opposite end surface 105d. When the light reaches the display portion 111, the light is scattered in the display portion 111 in directions shown by d1, d2 in FIG. 8. Due to these scattered lights, when the photographer sees the finder, the display portion 111 looks like as if it glowed.

Figure 9:
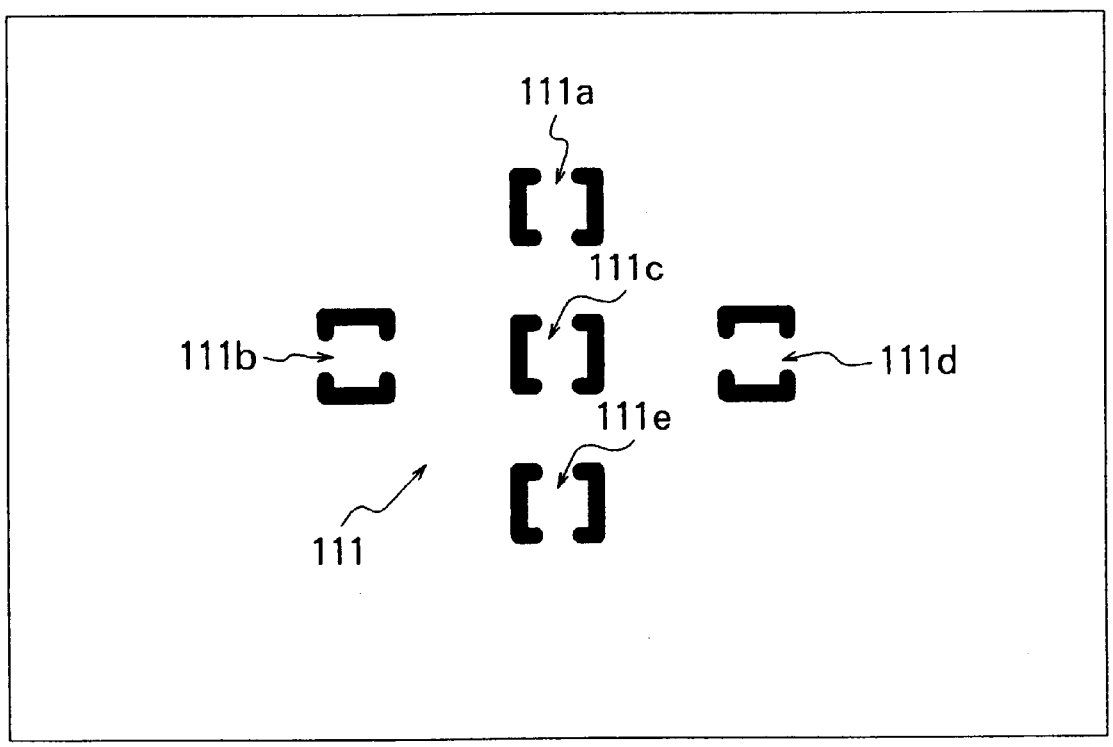
FIG. 9 is a plan view for describing a display portion of the finder display member shown in FIG. 8.

FIG. 9 is a plan view showing an example of the contents to be displayed in the finder. FIG. 9 shows the plan shape of the display portion 111 shown in FIG. 8. As shown in FIG. 9, the display portion 111 comprises display pattern portions 111a, 111b, 111c, 111d, 111e which are shaped like a pair of parentheses "[ ]". The parentheses-like display pattern portions are provided in order to indicate which region in the finder the auto-focus control mechanism of the camera performs an auto-focus control function. In the finder display member 105, the light transmittable electrodes (not shown) are formed in order that the display pattern portions can be controlled so that they may be scattered and be transparent. The electrodes are controlled, whereby the finder displays the display pattern portion alone, which represents the region to be focus-detected, of the five display pattern portions. The display pattern portions representing the remaining regions are changed to the transparent body and thus merged into a background image. Therefore, the photographer looking into the finder does not see these remaining display pattern portions.

Next, described is an AF auxiliary light irradiating mechanism using the light outgoing from the other end surface 105d of the finder display member 105 as the AF auxiliary light. As described above, the light is incident on the end surface 105c of the finder display member 105. The incident light travels in the glass plates 105a, 105b. The light is then scattered in the display portion 111. In this finder, as shown in FIG. 9, the area of the display portion 111 as the scattering body is so small that it does not cause a problem. Therefore, since an attenuation of a luminous energy reaching the other end surface 105d is low, the display portion 111 has little influence on the display contents in the finder.

That is, when the light is incident as shown by a direction of d' in FIG. 8, as described above, the incident light travels in the optical waveguide composed of the glass plates 105a, 105b. This light outgoes from the other end surface 105d as shown by d". Almost all of the incident luminous flux outgoes from the other end surface 105d. A maximum value of a vertical spread of the luminous flux outgoing from the other end surface 105d can be considered as a critical angle of a total reflection between a glass and an air.

The light outgoing from the other end surface 105d of the finder display member 105 passes through the objective lens 107 and the shutter 106. This light is directed toward the subject in a direction of c in FIG. 7. The light from the other end 105d is adjusted by the objective lens 107 so that it may have a predetermined angle of divergence. When the parallax is not negligible, a prism effect is obtained by off-centering the objective lens 107 or other methods, whereby it is possible to solve a difference in an optical axis between the light and a pick-up optical system.

When the luminous flux having the desirable angle of divergence and angle of radiation is projected as the AF auxiliary light in the direction shown by c in FIG. 7 from the whole surface of the camera 101, the light reflected from the subject illuminated with this projected light is detected by a receptor sensor (not shown) disposed in the camera 101. The auto-focus control mechanism is operated, whereby the focus can be automatically adjusted to the subject.

In this case, when the pattern is displayed in the finder, even if unnecessary, the shutter 106 of a light shutter mechanism is operated in order to prevent the luminous flux from radiating. This operation is performed for the following reasons. First, if the unnecessary light is radiated, the photographer and a person to be photographed may feel uneasy. Furthermore, when the photographer want to take a photograph so that the subject may not know an intention of photographing, if the light which can also serve as a previous notice light is emitted from the camera before the photographing, this sometimes results in inconvenience.

When the AF auxiliary light is unnecessary and not used, the shutter 106 of the light shutter mechanism allows the light to be shut out so that the light for use in the finder display may not leak outward. Although a mechanical mechanism for switching a transmission/shutout by attaching/removing a shielding plate is enough for the light shutter mechanism, the light shutter mechanism is not limited to this example. The light shutter mechanism may be the mechanism for shutting out the light by the use of an optical dispersed liquid crystal or the like. When the AF auxiliary light is not used, if the light is not radiated outward, this is a sensitivity problem unlike a mechanical problem such as a leakage of the light into a film. Thus, a complete light shutout is not required. Therefore, the output of the light has only to be stopped to such an extent that the light is not noticeable. It is therefore possible to use, as the optical gate means, the liquid crystal and a light shutout member using a physical phenomenon of electrical physical properties, although the shutter located in front of a film cannot be used.

When the subject is dark and thus the auto-focus control mechanism does not determine the contrast, the shutter 106 is opened. The light emitting device 104, which is the light source for illuminating the display, is then switched on. The light emitting device 104 keeps switched on until the focus is correctly adjusted, whereby the AF auxiliary light irradiating mechanism can be operated. The display in the display portion 111 of the finder display member 105 can be controlled in accordance with whether the liquid crystal is turned on or off as described above. Thus, when the light source for irradiating the AF auxiliary light is switched on, the display in the display portion 111 is turned off. At this time, since the AF auxiliary light is not associated with the display in the display portion 111, the photographer is not confused by the AF auxiliary light. An AF auxiliary light system and a display system of the display portion 111 as described above may be time-divisionally switched by the use of a light shutter and a display control.

As described above, the luminous flux is incident on the end surface 105c of the finder display member 105 from the light source. The incident light is totally reflected and passes through the glass plates 105a, 105b. The light outgoes from the opposite end surface 105d. Since few luminous energy is scattered and lost in the scattering body of the inner display portion 111, the luminous energy sufficient for the AF auxiliary light can be directed toward the subject with little loss. The shutter 106 for turning on/off the luminous flux is located on a luminous flux outgoing side. When the luminous flux is not necessary, the luminous flux can be operated so that it may not go outside. Furthermore, the subject can be illuminated with the luminous flux at a predetermined angle of divergence by an optical system of the lens 107 located behind the shutter 106.

The following description is provided for a diaphragm member illuminating mechanism for illuminating a diaphragm value shown on a diaphragm member 102a of a lens barrel 102 by using the light outgoing from the other end surface 105d of the finder display member 105 as a lens ring illuminating light. This mechanism is arranged for guiding the luminous flux for use in the finder display in the same manner as the AF auxiliary light to the diaphragm member 102a by the optical system and for illuminating the diaphragm member 102a.

In the conventional single-lens reflex camera, the optical system passes through the pentaprism and the light is then guided, whereby the diaphragm value is shown on the end in the visual field of the finder. This diaphragm member illuminating mechanism illuminates numbers indicative of the diaphragm value so that the diaphragm value can be visually recognized even if the environment is completely dark.

Figures 10A, 10B:
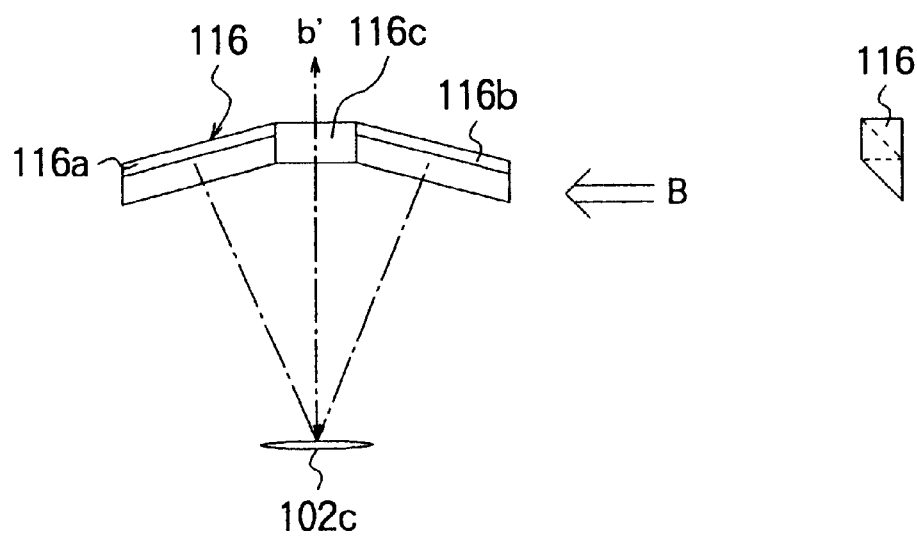
FIG. 10A shows a structure of a reflecting mirror for displaying a camera diaphragm member seen in a direction shown by A in FIG. 7.
FIG. 10B shows the structure of the reflecting mirror for displaying the camera diaphragm member seen in a direction shown by B in FIG. 10A.

As shown in FIG. 7, the light from the objective lens 107 travels in a direction shown by b in FIG. 7. A traveling direction of the light is changed by a reflecting mirror 116. The light is directed toward the portion indicating the diaphragm value of the diaphragm member 102a (reference numeral 102c in FIG. 10A). For example, the reflecting mirror 116 can be shaped as shown in FIG. 10A seen from a direction of A in FIG. 7. The reflecting mirror 116 comprises reflecting mirrors 116a, 116b which are inclined so that they may be directed toward a diaphragm value portion 102c of the diaphragm member 102a; and a light transmittable member 116c which is located at the center in order to guide the light reflected from the diaphragm value portion 102c to an optical observation system. The reflecting mirror 116 is shaped as shown in FIG. 10B seen from a direction of B in FIG. 10A. In such a manner, the diaphragm value portion 102c located at a position of twelve o'clock of the lens barrel 102 by the reflecting mirror 116 is illuminated with the light from the finder display member 105.

According to the above-mentioned diaphragm member illuminating mechanism, the light, which the diaphragm value portion 102c of the diaphragm member 102a of the lens tube 102 is illuminated with, is reflected from the diaphragm value portion 102c. The reflected light travels in a direction shown by b' in FIGS. 7 and 10A. As shown in FIG. 7, the light is reflected by another reflecting mirror 112 located over the reflecting mirror 116. The light outgoes through the pentaprism 108 and the eyepiece 109 in a direction shown by b" in FIG. 7. When the photographer looks into the finder window (not shown), the photographer can visibly recognize the diaphragm value.

The aforementioned diaphragm member illuminating mechanism can be arranged in the following manner. For example, when the information indicating that the environment is dark is obtained from a photometering member disposed in a camera body, the light emitting device 104 of the finder display device is automatically switched on so that the diaphragm member 102a may be illuminated.

When a diaphragm member illuminating light is also used as the AF auxiliary light, the luminous flux may be only partially used. The luminous energy of the diaphragm member illuminating light may be a little luminous energy of the luminous energy outgoing from the other end surface 105d of the finder display member 105. The diaphragm value can be therefore illuminated with the light leaking from the illumination for use in the AF auxiliary light, that is, an ambient light. When the diaphragm member 102a alone is illuminated and when the AF auxiliary light outgoes, in order to change the luminous energy of the illuminating light, a luminous energy changing device is additionally provided so that the number of light sources to be switched on, a voltage, a duty ratio or the like may be changed.

Figure 11:
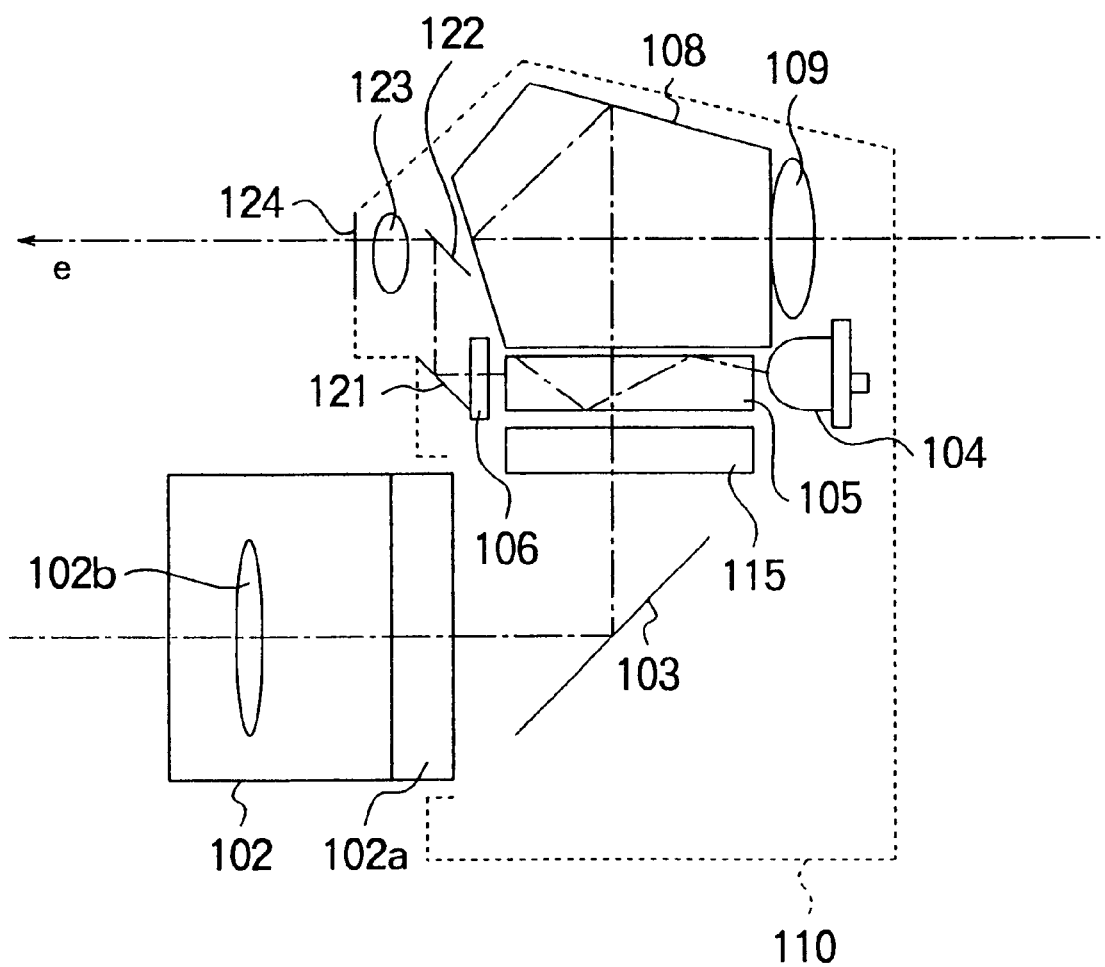
FIG. 11 is a side cross sectional view showing the schematic arrangement of the camera according to a third embodiment of the present invention.

The camera according to a third embodiment of the present invention will be described below with reference to FIGS. 11 and 12. FIG. 11 shows a single-lens reflex camera 110 similar to the camera shown in FIG. 7. Since the same portions have the same reference numerals, the description is omitted.

The camera 110 of FIG. 11 has the auto-focus control mechanism. The light from the finder display member 105 passes through the shutter 106. The AF auxiliary light travels in a direction shown by e in FIG. 7 through reflecting mirrors 121, 122, a lens 123 and a logo mark portion 124. The light outgoes toward the subject.

Figure 12:
FIG. 12 shows a logo mark portion on the camera shown in FIG. 11.

The logo mark portion 124 is arranged so that characters "Nikon" as shown in FIG. 12 may be displayed, for example. Each alphabet character portion (a black character portion in FIG. 12) comprises the light transmittable member. The logo mark portion 124 is located on a center upper position of the camera which is a front surface of the pentaprism 108 of the single-lens reflex camera 110.

In the example shown in FIG. 7, the light is irradiated from the position of the other end surface 105d of the finder display member 105, whereby the light is changed to the AF auxiliary light. Since the finder display member 105 is located near the screen 115 and just below the pentaprism 108, an AF auxiliary light emitting portion is located in the position reached by horizontally outward extending the finder display member 105. If the AF auxiliary light is emitted from the light emitting portion in this position, this does not cause a problem. However, when a large-aperture lens barrel is attached to the camera, the large-aperture lens barrel may interfere with a travel of the AF auxiliary light. Thus, according to the AF auxiliary light irradiating mechanism as shown in FIG. 11, the light from the finder display member 105 is reflected by the reflecting mirrors 121, 122, whereby the AF auxiliary light can be projected from the front surface of the pentaprism 108.

When the luminous flux is emitted from the front surface of the pentaprism 108 of the single-lens reflex camera, regardless of the attached lens, it is possible to maintain a distance between the emitted luminous flux and the lens barrel to such an extent that the lens barrel does not interfere with the emitted luminous flux. In many cases, the logo mark of the camera is shown on the front surface of the pentaprism 108 in order to represent the identity of the camera or the like. According to the AF auxiliary light irradiating mechanism as shown in FIG. 11, when the light is emitted from the front surface, the logo mark located on the front surface is arranged so that it may be light transmittable. Thus, since the logo mark can be used in a light transmittable state, it is useful. As described above, the logo mark portion 124 is allowed to be light transmittable. The subject is then irradiated with the luminous flux so that the logo mark may be projected, whereby the logo mark is projected on the subject. A bright/dark pattern equal to the reversed logo mark is thus generated. When the light is projected on the subject in such a manner, if the emitted light has already the bright/dark pattern, focus information can be also obtained from the subject having few patterns themselves. Therefore, this mechanism is desirable for the auto-focus control mechanism. Moreover, since the logo mark glows, the person to be photographed receives a strong impression from the logo mark. A light emission of the logo mark allows a presence of the logo mark to be clear. An advertisement effect for establishing the identity by the logo mark can be also expected.

As described above, in this embodiment, the light from the light source of the finder display device travels in the optical waveguide between both the end surfaces of the glass plates constituting the display device. Thus, only when the luminous flux collides with the scattering body on the way and is thus scattered, the luminous flux is lost. In other words, when the scattering body is absent, the luminous flux outgoes from the opposite end surface with little loss. In the camera, this light is used for at least one of the AF auxiliary light and the diaphragm member illuminating light.

In the camera according to the embodiment, the light source used for the illumination in the finder display device can be used as the light source for the AF auxiliary light and the diaphragm member illuminating light. Thus, the camera can be inexpensively provided with the functions for irradiating with the AF auxiliary light and for illuminating the diaphragm member without consideration for a free space. Furthermore, a few optical systems are merely added to a light output end side of the finder display member, whereby an object can be achieved. Since a small number of additional components are enough, this camera is advantageous in both aspects of a spatial merit and a cost. Moreover, the logo mark portion is arranged so that it may emit the light, whereby originality of the camera can be emphasized and the advertisement effect can be also expected.

In the second and third embodiments, the shutter 106 and the objective lens 107 constitute the optical gate means and the optical system, respectively.

According to the second and third embodiments, it is possible to provide the camera capable of comprising the functions such as the AF auxiliary light irradiating mechanism and the diaphragm member illuminating mechanism without requiring the additional space and the finder display device for realizing such a camera.

Although the preferred embodiment of the present invention has been described in detail, it should be understood that various changes, substitutions and alternations can be made therein without departing from spirit and scope of the inventions as defined by the appended claims.

What is claimed is:

1. A display device, comprising:
   a pair of light transmittable members;
   a display member located between said pair of light transmittable members and having a shape of a pattern to be displayed, said display member comprising a polymer dispersed liquid crystal material whose light transmittance is electrically changeable between a first state that transmits light and a second state that substantially blocks light; and
   a pair of light transmittable electrodes, at least one of said pair of light transmittable electrodes having a shape corresponding to said pattern, said light transmittable electrodes being respectively formed on corresponding ones of said pair of light transmittable members for electrically controlling said polymer dispersed liquid crystal material,
   wherein when said electrodes are turned on, said polymer dispersed liquid crystal material is changed to said first state, and when said electrodes are turned off, said polymer dispersed liquid crystal material is changed to said second state.

2. The display device according to claim 1, further comprising a plurality of display members arranged independently of each other, each display member comprising said polymer dispersed liquid crystal material having a shape of a pattern to be formed, whereby a plurality of patterns may be displayed independently from each other.

3. The display device according to claim 1, wherein said display member further comprises a pattern forming member formed with a cavity defining the shape of said pattern and is filled with said polymer dispersed liquid crystal material.

4. The display device according to claim 1, wherein said polymer dispersed liquid crystal material is cloudy with a lower light transmittance in the second state and is transparent with a higher light transmittance in the first state.

5. The display device according to claim 4, wherein said polymer dispersed liquid crystal material displays the pattern when said polymer dispersed liquid crystal material has the lower light transmittance and said polymer dispersed liquid crystal material displays no pattern when said polymer dispersed liquid crystal material has the higher light transmittance.

6. The display device according to claim 4, further comprising:
   a light source;
   wherein when the light transmittance of said polymer dispersed liquid crystal material is changed to be lower, said light source illuminates said polymer dispersed liquid crystal material whereby said polymer dispersed liquid crystal material substantially blocks the illuminated light so that said polymer dispersed liquid crystal material brightly displays said pattern.

7. The display device according to claim 6, wherein said light source is located so that the light thereof may be incident on end surfaces of said pair of light transmittable members.

8. The display device according to claim 6, wherein said light source is located so that the light thereof may pass through the surfaces of said pair of light transmittable members and illuminate said polymer dispersed liquid crystal material.

9. The display device according to claim 6, further comprising:
   illumination-switching means for switching said light source on or off; and
   display selecting means for selecting whether or not said polymer dispersed liquid crystal material displays the pattern.

10. A camera, comprising:
    an optical system for imaging a finder image;
    a display device including:
      a pair of light transmittable members;
      a display member located between said pair of light transmittable members and having a shape of a pattern to be displayed, said display member comprising a polymer dispersed liquid crystal material whose light transmittance is electrically changeable between a first state that transmits light and a second state that substantially blocks light; and
      a pair of light transmittable electrodes, at least one of said pair of light transmittable electrodes having a shape corresponding to said pattern, said light transmittable electrodes being respectively formed on corresponding ones of said pair of light transmittable members for electrically controlling said polymer dispersed liquid crystal material,
      wherein when said electrodes are turned on, said polymer dispersed liquid crystal material is changed to said first state, and when said electrodes are turned off, said polymer dispersed liquid crystal material is changed to said second state, and wherein said display device is provided in the optical system of a finder so that said polymer dispersed liquid crystal material displays said pattern to be visible in a finder image; and an eyepiece for viewing the finder image and the pattern.

11. The camera according to claim 10, further comprising:
    a light source;
    photometering means for measuring a luminance of a subject;
    display selecting means for selecting whether or not said polymer dispersed liquid crystal material displays the pattern; and
    illumination-switching means for switching said light source on or off,
    wherein when the light transmittance of said polymer dispersed liquid crystal material is changed to be lower, said light source illuminates said polymer dispersed liquid crystal material whereby said polymer dispersed liquid crystal material substantially blocks the illuminated light so that said polymer dispersed liquid crystal material brightly displays said pattern, and wherein (said illumination-switching means is automatically controlled in accordance with subject luminance information from said photometering means.

12. A finder display device, comprising:
    a display member having a display portion for forming a predetermined display in a finder, said display portion comprising a polymer dispersed liquid crystal material having light transmittance that is electrically changeable between a first state which transmits light and a second state which substantially blocks light;
    a light source for illuminating said display portion of said display member; and
    an optical system for gateably guiding light from the light source outgoing through said display member to an external member to be imaged by a camera.

13. The finder display device according to claim 12, wherein said display member comprises a plate member for forming an optical waveguide, and said illuminating means and said optical system are disposed near one end surface and the other end surface of said plate member, respectively.

14. A camera, comprising:
    an optical system for imaging a finder image;
    a finder display device including:
      a display member having a display portion for forming a predetermined display in a finder, said display portion comprising a polymer dispersed liquid crystal material having a light transmittance that is electrically changeable between a first state which transmits light and a second state which substantially blocks light; and
      a light source for illuminating said display portion of said display member; and
    said optical system gateably guiding light from the light source outgoing through said display member to an external member to be imaged by the camera.

15. The camera according to claim 14 which illuminates a subject by the light outgoing from said optical system.

16. The camera according to claim 15 further comprising:
    a mark member,
    wherein said subject is illuminated through said mark member by the light outgoing from said optical system.

17. The camera according to claim 16, wherein said mark member is a logo mark shown on the surface of the camera.

18. The camera according to claim 14, wherein said display portion of said display member displays a region where a focus detection is performed.

19. The camera according to claim 14 further comprising:
    a lens diaphragm member,
    wherein said lens diaphragm member is illuminated by the light outgoing from said optical system whereby diaphragm information shown on said lens diaphragm member can be visually read by the light reflected from said lens diaphragm member.

* * * * *